United States Patent
Hsu et al.

(10) Patent No.: US 10,198,652 B2
(45) Date of Patent: Feb. 5, 2019

(54) IMAGE PROCESSING METHOD AND NON-TRANSITORY COMPUTER-READABLE STORAGE MEDIUM

(71) Applicant: NATIONAL CHUNG CHENG UNIVERSITY, Chia-Yi (TW)

(72) Inventors: Wei-Yen Hsu, Chia-Yi (TW); Nai-En Chang, Chia-Yi (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 43 days.

(21) Appl. No.: 15/654,684

(22) Filed: Jul. 19, 2017

(65) Prior Publication Data

US 2018/0336429 A1    Nov. 22, 2018

(30) Foreign Application Priority Data

May 17, 2017    (TW) .............................. 106116348 A (51) Int. Cl.
| | | |
|---|---|---|
| *G06K 9/40* | (2006.01) | |
| *G06T 7/269* | (2017.01) | |
| *G02B 5/02* | (2006.01) | |
| *G06T 5/00* | (2006.01) | |
| *G06T 7/11* | (2017.01) | |

(52) U.S. Cl.
CPC ............ *G06K 9/40* (2013.01); *G02B 5/0257* (2013.01); *G06T 5/002* (2013.01); *G06T 5/003* (2013.01); *G06T 7/11* (2017.01); *G06T 7/269* (2017.01)

(58) Field of Classification Search
CPC .......... G06T 5/002; G06T 7/269; G06T 7/11; G06K 9/40; G02B 5/0257; G09G 5/005
See application file for complete search history.

(56) References Cited

U.S. PATENT DOCUMENTS

| | | | | |
|---|---|---|---|---|
| 7,876,974 | B2 * | 1/2011 | Brajovic | ................... G06T 5/50 |
| | | | | 348/597 |
| 9,741,099 | B2 * | 8/2017 | Lim | ........................ G06T 5/001 |
| 2006/0285769 | A1 * | 12/2006 | Wang | ................. G06K 9/00241 |
| | | | | 382/274 |
| 2014/0341481 | A1 * | 11/2014 | Panetta | ................... G06T 5/002 |
| | | | | 382/274 |
| 2015/0296193 | A1 * | 10/2015 | Cote | ...................... H04N 9/646 |
| | | | | 382/167 |
| 2017/0046557 | A1 * | 2/2017 | Laleg-Kirati | ........... G06T 5/002 |

\* cited by examiner

*Primary Examiner* — Mekonen Bekele
(74) *Attorney, Agent, or Firm* — CKC & Partners Co., Ltd.

(57) ABSTRACT

An image processing method includes the following steps. An original image is read, and the original image includes a red channel layer, a green channel layer and a blue channel layer. A processing is performed on the red channel layer, the green channel layer and the blue channel layer, respectively, to get a derived red channel layer, a derived green channel layer and a derived blue channel layer. And the derived red channel layer, the derived green channel layer and the derived blue channel layer are combined to form a new image. The processing includes the following steps. Gradient-variations of a plurality of directions of a region are calculated. An average of the gradient-variations is calculated. A calculating procedure is provided to decide diffusion-coefficient equations of the directions, and each of the diffusion-coefficient equations is substituted into an anisotropic diffusion equation.

15 Claims, 5 Drawing Sheets
(1 of 5 Drawing Sheet(s) Filed in Color)

IMAGE PROCESSING METHOD AND NON-TRANSITORY COMPUTER-READABLE STORAGE MEDIUM

RELATED APPLICATIONS

This application claims priority to Taiwan Application Serial Number 106116348, filed May 17, 2017, which is herein incorporated by reference.

BACKGROUND

Technical Field

The present disclosure relates to an image processing method and a non-transitory computer-readable storage medium. More particularly, the present disclosure relates to an image processing method and a non-transitory computer-readable storage medium based on the anisotropic diffusion.

Description of Related Art

Anisotropic diffusion equation, also called P-M diffusion equation, is provided by Peronan and Malik in 1990, and the anisotropic diffusion equation is widely used in image processing to reduce noise better and preserve more true details in digital photographs. The anisotropic diffusion equation is expressed as shown below:

$$\frac{\partial I}{\partial t} = div(c(|\nabla I|)\nabla I).$$

Where I is an original image, $\nabla$ is a gradient operator, div is a divergence operator, and $c(|\nabla I|)$ is a diffusion equation where a gradient equation is used to control diffusing speed so as to protect the edge information of the image during diffusing.

However, only gradient-variations of four directions of the image are considered in P-M diffusion equation. Thus, the edge preservation and noise control effect are not good enough. Furthermore, the noise is filtered by the same equation in different regions with different gradient-variations, as a result, the processing effect is not well.

Therefore, how to improve the image processing method to increase the effect becomes a pursuit target for practitioners.

SUMMARY

An image processing method includes the following steps. An original image is read, and the original image includes a red channel layer, a green channel layer and a blue channel layer. A processing is performed on the red channel layer, the green channel layer and the blue channel layer, respectively, to get a derived red channel layer, a derived green channel layer and a derived blue channel layer. And the derived red channel layer, the derived green channel layer and the derived blue channel layer are combined to form a new image. The processing includes the following steps. Gradient-variations of a plurality of directions of a region are calculated. An average of the gradient-variations is calculated. A calculating procedure is provided to decide diffusion-coefficient equations of the directions, and each of the diffusion-coefficient equations are substituted into an anisotropic diffusion equation. The anisotropic diffusion equation is expressed as shown below:

$$I = I_0 + \lambda \times \Sigma_{i=1}^{n}[c(|\nabla I_i|)\nabla I_i].$$

If one of the gradient-variations is smaller than or equal to the average, the diffusion-coefficient equation of the corresponding direction is a smoothening equation expressed as shown below:

$$c(|\nabla I_i|) = \sin^2\left(\frac{\pi}{2} \times e^{-(|\nabla I_i|/k^2)}\right) \times \alpha.$$

If one of the gradient-variations is larger than the average, the diffusion-coefficient equation of the corresponding direction is a sharpening equation expressed as shown below:

$$c(|\nabla I_i|) = \cos^2\left(\frac{\pi}{2} \times e^{-(|\nabla I_i|/k^2)}\right) \times \beta.$$

Where $I_0$ is an original data of the region, I is a derived data of the region, $\lambda$ is a constant for controlling the diffusion-speed, $\nabla I_i$ is each gradient-variation, k is a constant for controlling each gradient-variation $\nabla I_i$, and $\alpha$ and $\beta$ are predetermined weight-parameters.

An image processing method includes the following steps. An original image is read. The original image is converted to LAB color space to get an L channel layer, an A channel layer and a B channel layer. A processing is performed on the L channel layer to get a derived L channel layer. And the derived L channel layer, the A channel layer and the B channel layer are combined to form a new image. The processing includes the following steps. Gradient-variations of a plurality of directions of a region are calculated. An average of the gradient-variations is calculated. A calculating procedure is provided to decide diffusion-coefficient equations of the directions, and each of the diffusion-coefficient equations is substituted into an anisotropic diffusion equation. The anisotropic diffusion equation is expressed as shown below:

$$I = I_0 + \lambda \times \Sigma_{i=1}^{n}[c(|\nabla I_i|)\nabla I_i].$$

If one of the gradient-variations is smaller than or equal to the average, the diffusion-coefficient equation of the corresponding direction is a smoothening equation expressed as shown below:

$$c(|\nabla I_i|) = \sin^2\left(\frac{\pi}{2} \times e^{-(|\nabla I_i|/k^2)}\right) \times \alpha.$$

If one of the gradient-variations is larger than the average, the diffusion-coefficient equation of the corresponding direction is a sharpening equation expressed as shown below:

$$c(|\nabla I_i|) = \cos^2\left(\frac{\pi}{2} \times e^{-(|\nabla I_i|/k^2)}\right) \times \beta.$$

Where $I_0$ is an original data of the region, I is a derived data of the region, $\lambda$ is a constant for controlling the diffusion-speed, $\nabla I_i$ is each gradient-variation, k is a constant for controlling each gradient-variation $\nabla I_i$, and $\alpha$ and $\beta$ are predetermined weight-parameters.

A non-transitory computer-readable storage medium, which stores a computer program instruction that performs an image processing method after loading in an electronic device, is provided. The image processing method includes the following steps. An original image is read, and the original image includes a red channel layer, a green channel layer and a blue channel layer. A processing is performed on the red channel layer, the green channel layer and the blue channel layer, respectively, to get a derived red channel layer, a derived green channel layer and a derived blue channel layer. And the derived red channel layer, the derived green channel layer and the derived blue channel layer are combined to form a new image. The processing includes the following steps. Gradient-variations of a plurality of directions of a region are calculated. An average of the gradient-variations is calculated. A calculating procedure is provided to decide diffusion-coefficient equations of the directions, and each of the diffusion-coefficient equations is substituted into an anisotropic diffusion equation The anisotropic diffusion equation is expressed as shown below:

$$I = I_0 + \lambda \times \Sigma_{i=1}^{n}[c(|\nabla I_i|)\nabla I_i].$$

If one of the gradient-variations is smaller than or equal to the average, the diffusion-coefficient equation of the corresponding direction is a smoothening equation expressed as shown below:

$$c(|\nabla I_i|) = \sin^2\left(\frac{\pi}{2} \times e^{-(|\nabla I_i|/k^2)}\right) \times \alpha.$$

If one of the gradient-variations is larger than the average, the diffusion-coefficient equation of the corresponding direction is a sharpening equation shown expressed as shown below:

$$c(|\nabla I_i|) = \cos^2\left(\frac{\pi}{2} \times e^{-(|\nabla I_i|/k^2)}\right) \times \beta.$$

Were $I_0$ is an original data of the region. I is a derived data of the region, $\lambda$ is a constant for controlling the diffusion-speed, $\nabla I_i$ is each gradient-variation, k is a constant for controlling each gradient-variation $\nabla I_i$, and $\alpha$ and $\beta$ are predetermined weight-parameters.

BRIEF DESCRIPTION OF THE DRAWINGS

The patent or application file contains at least one drawing executed in color. Copies of this patent or patent application publication with color drawing(s) will be provided by Office upon request and payment of the necessary fee. The disclosure can be more fully understood by reading the following detailed description of the embodiments, with reference made to the accompanying drawings as follows.

DETAILED DESCRIPTION

Figure 1:
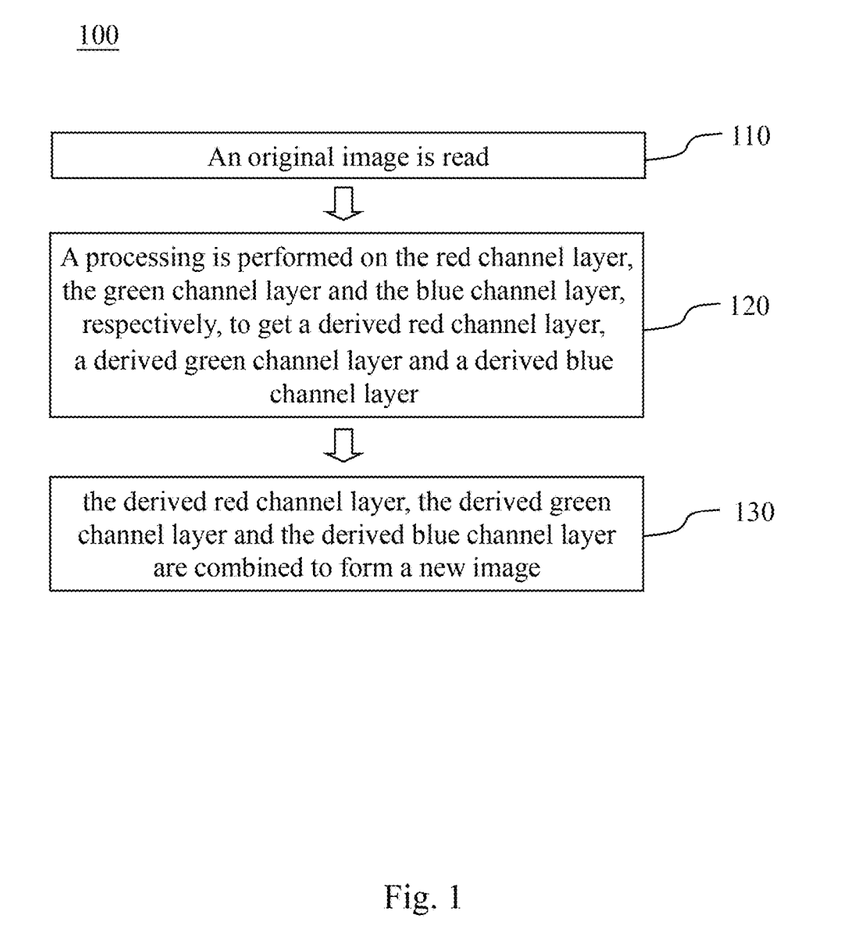
FIG. 1 shows a flow chart of an image processing method according to one embodiment of the present disclosure.
Figure 2:
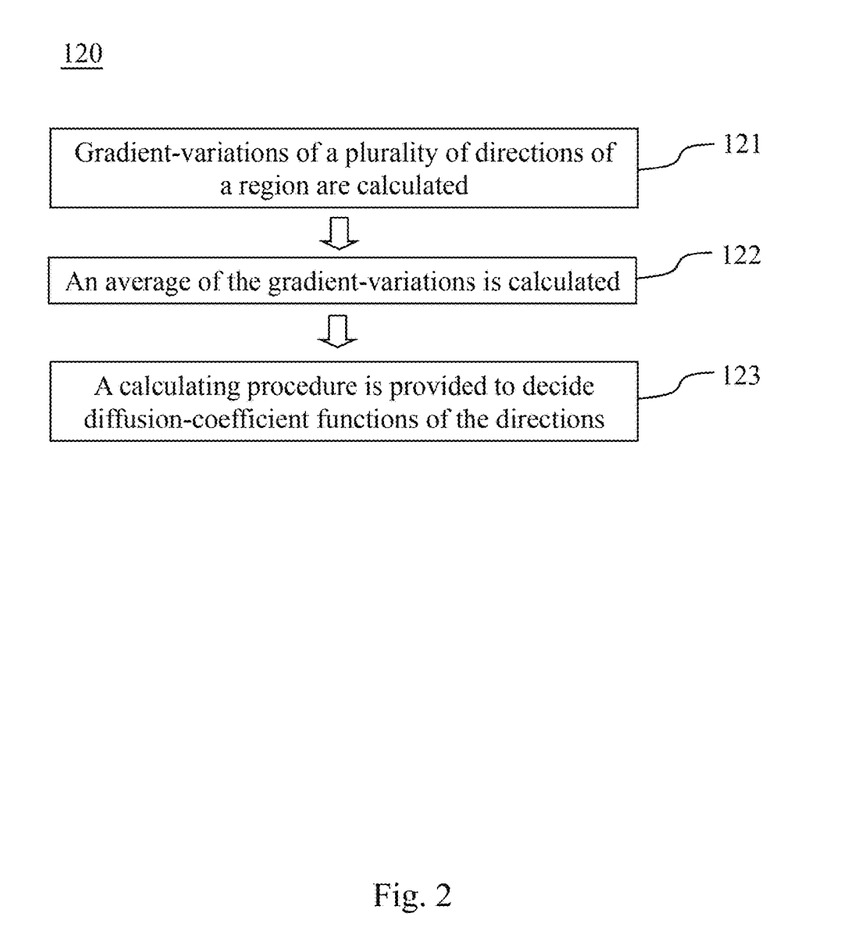
FIG. 2 shows a flow chart of a calculating procedure of Step 120 of FIG. 1.
Figure 3A:
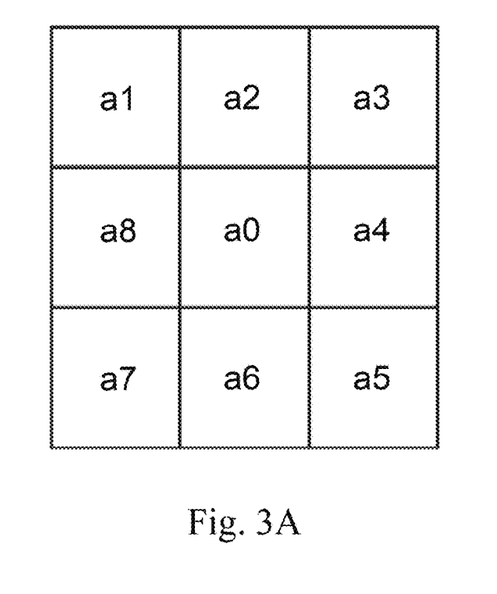
FIG. 3A shows a schematic view of 3×3 pixels.
Figure 3B:
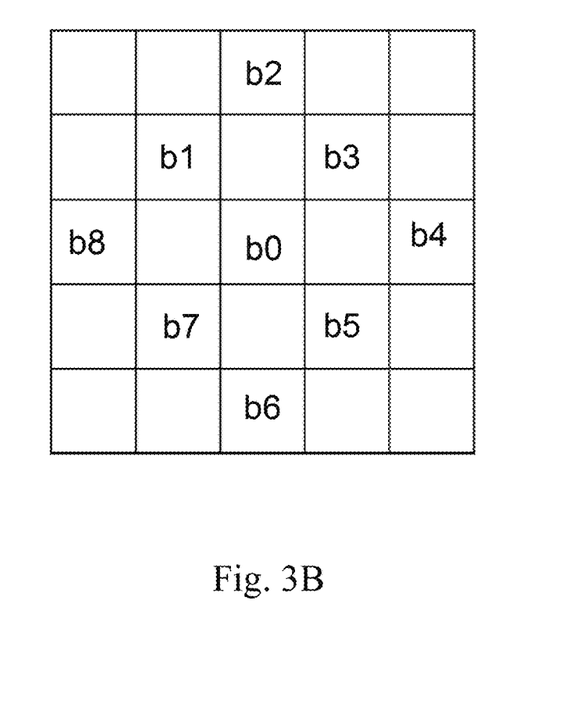
FIG. 3B shows a schematic view of 5×5 pixels.
Figure 4A:
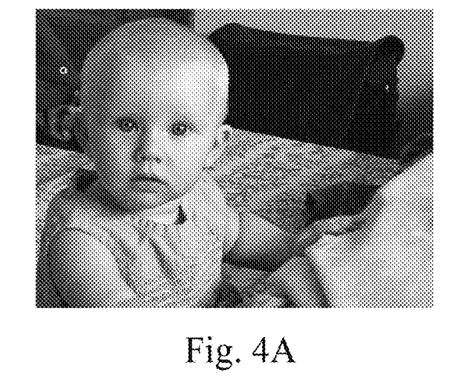
FIG. 4A shows an original image.
Figure 4B:
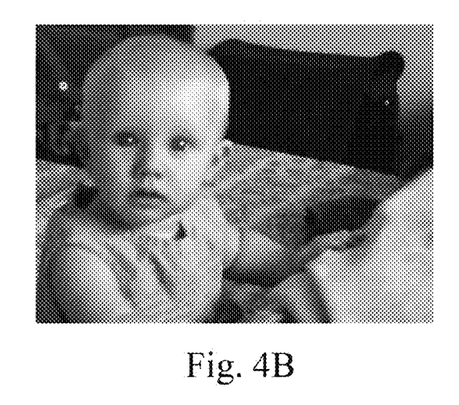
FIG. 4B shows a new image which is derived.
Figure 4C:
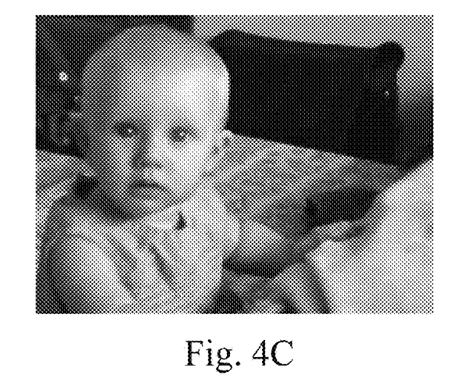
FIG. 4C shows another new image which is derived.

Please refer to FIG. 1, FIG. 2, FIG. 3A, FIG. 3B, FIG. 4A, FIG. 4B and FIG. 4G. FIG. 1 shows a flow chart of an image processing method 100 according to one embodiment of the present disclosure. FIG. 2 shows a flow chart of a calculating procedure of Step 120 of FIG. 1. FIG. 3A shows a schematic view of 3×3 pixels. FIG. 3B shows a schematic view of 5×5 pixels. FIG. 4A shows an original image. FIG. 4B shows a new image which is derived. FIG. 4C shows another new image which is derived.

The image processing method 100 includes Step 110, Step 120 and Step 130.

In Step 110, an original image is read, and the original image includes a red channel layer, a green channel layer and a blue channel layer.

In Step 120, a processing is performed on the red channel layer, the green channel layer and the blue channel layer, respectively, to get a derived red channel layer, a derived green channel layer and a derived blue channel layer.

In Step 130, the derived red channel layer, the derived green channel layer and the derived blue channel layer are combined to form a new image.

To be more particular, In Step 120, the processing includes Step 121, Step 122 and Step 123.

In Step 121, gradient-variations of a plurality of directions of a region are calculated. In Step 122, an average of the gradient-variations is calculated, And in Step 123, a calculating procedure is provided to decide diffusion-coefficient equations of the directions, and each of the diffusion-coefficient equations is substituted into an anisotropic diffusion equation. The anisotropic diffusion equation can be expressed by Eq.(1) shown below:

$$I = I_0 + \lambda \times \Sigma_{i=1}^{n}[c(|\nabla I_i|)\nabla I_i] \qquad \text{Eq.(1).}$$

If one of the gradient-variations is smaller than or equal to the average, the diffusion-coefficient equation of the corresponding direction is a smoothening equation expressed by Eq.(2) shown below:

$$c(|\nabla I_i|) = \sin^2\left(\frac{\pi}{2} \times e^{-(|\nabla I_i|/k^2)}\right) \times \alpha. \qquad \text{Eq.(2)}$$

If one of the gradient-variations is larger than the average, the diffusion-coefficient equation of the corresponding direction is a sharpening equation expressed by Eq.(3) shown below:

$$c(|\nabla I_i|) = \cos^2\left(\frac{\pi}{2} \times e^{-(|\nabla I_i|/k^2)}\right) \times \beta. \qquad \text{Eq.(3)}$$

Where $I_0$ is an original data of the region. I is a derived data of the region. $\lambda$ is a constant for controlling the diffusion-speed. $\nabla I_i$ is each gradient-variation. k is a constant for controlling each gradient-variation $\nabla I_i$, $\alpha$ and $\beta$ are predetermined weight-parameters.

Because only the strength of smooth is controlled in P-M equation to reduce noise, a region of large gradient is under a weak smooth and a region which is possible to be an edge is not strengthened. Through the diffusion-coefficient equation and the choosing method for diffusion-coefficient equation, the region of large gradient is sharpened while other region is smoothened. The image quality is promoted. The detail of the image processing method 100 is illustrated in the following paragraphs.

The original image is shown as FIG. 4A, which is composed of red, green and blue color. In Step 110, the original image is read by an electronic device, such as a computer, and information of different color layers can be obtained for further process. Precisely, the red scale of the original image is separated to form a red channel layer, the green scale of the original image is separated to form a green channel layer, and the blue scale of the original image is separated to form a blue channel layer.

In Step 120, the processing is performed on the red channel layer, the green channel layer and the blue channel layer, respectively. In the processing, each of the red channel layer, the green channel layer and the blue channel layer can be divided in to a plurality of regions, and one region is equal to one pixel in the embodiment.

In Step 121, there are many ways to calculate the gradient-variations. As shown in FIG. 3A, there are 3×3 pixels and labeled as a0, a1, a2, a3, a4, a5, a6, a7, a8. The gradient-variations of eight directions of the region a0 can be calculated. The eight directions include two horizontal directions, two longitudinal directions and two diagonal directions, and the gradient-variations of the directions can be obtained by Eqs.(4)-(11) as shown below:

$$\nabla I_1 = I_{a1} - I_{a0} \quad \text{Eq.(4)};$$

$$\nabla I_2 = I_{a2} - I_{a0} \quad \text{Eq.(5)};$$

$$\nabla I_3 = I_{a3} - I_{a0} \quad \text{Eq.(6)};$$

$$\nabla I_4 = I_{a4} - I_{a0} \quad \text{Eq.(7)};$$

$$\nabla I_5 = I_{a5} - I_{a0} \quad \text{Eq.(8)};$$

$$\nabla I_6 = I_{a6} - I_{a0} \quad \text{Eq.(9)};$$

$$\nabla I_7 = I_{a7} - I_{a0} \quad \text{Eq.(10); and}$$

$$\nabla I_8 = I_{a8} - I_{a0} \quad \text{Eq.(11)}.$$

Where $I_{a0}$, $I_{a1}$, $I_{a2}$, $I_{a3}$, $I_{a4}$, $I_{a5}$, $I_{a6}$, $I_{a7}$, $I_{a8}$ are original data of the regions a0, a2, a3, a4, a5, a6, a7, a8, respectively, and $\nabla I_1$, $\nabla I_2$, $\nabla I_3$, $\nabla I_4$, $\nabla I_5$, $\nabla I_6$, $\nabla I_7$ and $\nabla I_8$ are the gradient-variations of eight directions of the region a0, respectively.

The average $\nabla I_{ave}$ of gradient-variations can be obtained by Eq.(12) shown below:

$$\nabla I_{ave} = (\Sigma_{i=1}^{8} \nabla I_i)/8 \quad \text{Eq.(12)}.$$

Consequently, comparing each of the gradient-variations to the average, the diffusions equations of the directions can be decided. For example, the values of $\nabla I_1$, $\nabla I_2$, $\nabla I_3$, $\nabla I_4$, $\nabla I_5$, $\nabla I_6$, $\nabla I_7$ and $\nabla I_8$ are 17, 5, 20, 3, 18, 50, 25 and 11, respectively, and the average is 18.625. Through the comparison of each gradient-variation and the average, the diffusion-coefficient equations of the directions can be chosen.

Moreover, α of each of the horizontal directions and each of the longitudinal directions is √2, and α of each of the diagonal directions is 1. β of each of the horizontal directions and each of the longitudinal directions is 1/√2, and β of each of the diagonal directions is ½. Therefore, diffusion-coefficient equations of the directions can be defined and be expressed by Eqs.(13) to (20) shown below:

$$c(|\nabla I_1|) = \sin^2(\frac{\pi}{2} \times e^{-(|\nabla I_1|/k^2)}) \times 1; \quad \text{Eq.(13)}$$

$$c(|\nabla I_2|) = \sin^2(\frac{\pi}{2} \times e^{-(|\nabla I_2|/k^2)}) \times \sqrt{2}; \quad \text{Eq.(14)}$$

$$c(|\nabla I_3|) = \cos^2(\frac{\pi}{2} \times e^{-(|\nabla I_3|/k^2)}) \times \frac{1}{2}; \quad \text{Eq.(15)}$$

-continued $$c(|\nabla I_4|) = \sin^2(\frac{\pi}{2} \times e^{-(|\nabla I_4|/k^2)}) \times \sqrt{2}; \quad \text{Eq.(16)}$$

$$c(|\nabla I_5|) = \sin^2(\frac{\pi}{2} \times e^{-(|\nabla I_5|/k^2)}) \times 1; \quad \text{Eq.(17)}$$

$$c(|\nabla I_6|) = \cos^2(\frac{\pi}{2} \times e^{-(|\nabla I_6|/k^2)}) \times \frac{1}{\sqrt{2}}; \quad \text{Eq.(18)}$$

$$c(|\nabla I_7|) = \cos^2(\frac{\pi}{2} \times e^{-(|\nabla I_7|/k^2)}) \times \frac{1}{2}; \text{ and} \quad \text{Eq.(19)}$$

$$c(|\nabla I_8|) = \sin^2(\frac{\pi}{2} \times e^{-(|\nabla I_i|/k^2)}) \times \sqrt{2}. \quad \text{Eq.(20)}$$

When the diffusion-coefficient equations of the directions of the region a0 are defined, the diffusion-coefficient equations can be substituted into the anisotropic diffusion equation to get a derived information of the region a0. Each region (each pixel) of the red channel layer, the green channel layer and the blue channel layer can be processed as above to get the derived red channel layer, the derived green channel layer and the derived blue channel layer. Finally, the derived red channel layer, the derived green channel layer and the derived blue channel layer are combined to complete the image processing.

Furthermore, the processing can be performed five times in Step 120 to get a better effect. Precisely, Steps 121, 122 and 123 are deemed as a cycle and the cycle will be circularly executed five times. After the calculating procedure in Step 123, the gradient-variations of the directions become different, and the average will become different, too. Hence, in order to ensure the image quality, the diffusion-coefficient equations need to be re-selected. The image in FIG. 4A will become the image in FIG. 4B after the image processing method 100 being executed. As shown in FIG. 4B, most noise has been filtered, and the edges of articles are not affected. For example, the outlines of the table, the desk and the baby are still clear. The more times Steps 121 to 123 are circularly executed the more blurred the image becomes. Therefore, Steps 121 to 123 can be circularly executed several times base on the requirement, and it will not be limited to five times.

FIG. 3B shows another way for calculating gradient-variations of the directions. There are 5×5 pixels, and the gradient-variations of eight directions of region b0 can be calculated by subtracting the value of region b0 from the value of the regions b1, b2, b3, b4, b5, b6, b7, b8, respectively. The calculating method and the way to choose diffusion-coefficient equations of eight directions are similar to the description of FIG. 3A, and the detail will not be descripted again.

In the calculating method of FIG. 3B, the eight directions also include two horizontal directions, two longitudinal directions and two diagonal directions. α of each of the horizontal directions and each of the longitudinal directions is 1/√2, and α of each of the diagonal directions is 1. β of each of the horizontal directions and each of the longitudinal directions is ½√2, and β of each of the diagonal directions is ½. Therefore, the diffusion-coefficient equations of eight directions can be defined. Consequently, the image in FIG. 4A will become the image in FIG. 4C after the image processing method 100 is executed base on the diffusion-coefficient equations. Steps 121 to 123 are circularly executed five times to get the image in FIG. 4C. In other embodiment, Steps 121 to 123 can be circularly executed several times base on the requirement, and it will not be limited to five times. The way that choosing 9 pixels from 25 pixels to calculate the gradient-variations of the eight directions, as shown in FIG. 3B, considers the gradient-variations in a larger range; thus, the blurred effect of the image in FIG. 4C is larger than the image in FIG. 4B. However, the outlines of articles can still be preserved due to the characteristics of the image processing method 100.

In other embodiment, 16 pixels can be chosen form 25 pixels to calculate the gradient-variations of the 16 directions of the region (the central pixel). For example, 16 edge-pixels can be chosen from 5×5 pixels.

Figure 5:
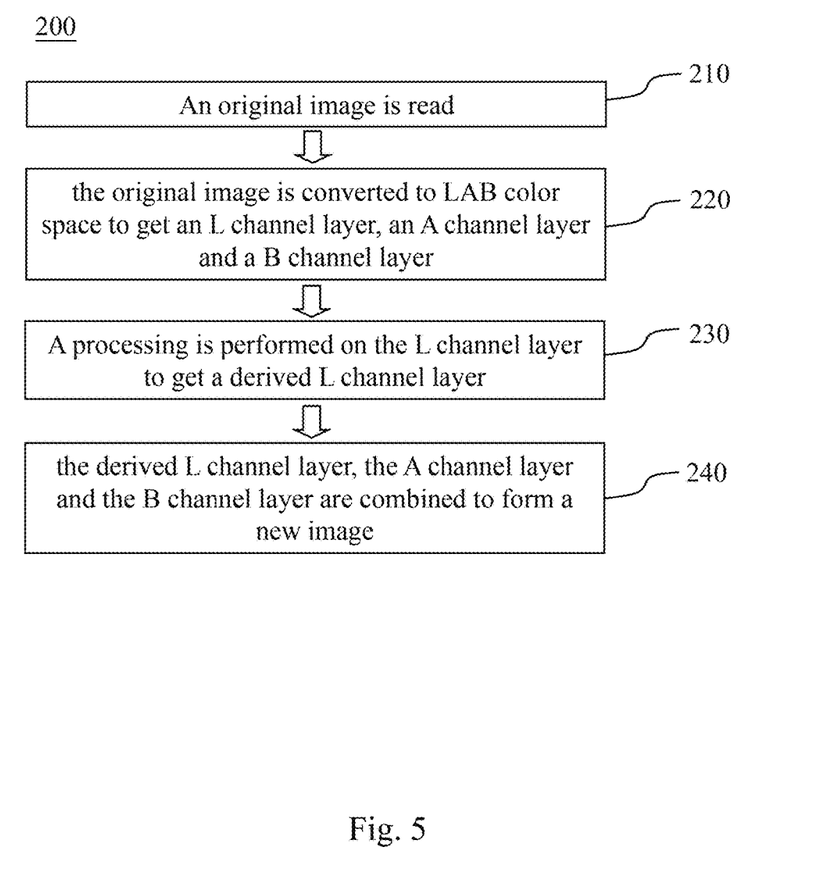
FIG. 5 shows another flow chart of an image processing method according to another embodiment of the present disclosure.

Please refer to FIG. 5. FIG. 5 shows another flow chart of an image processing method 200 according to another embodiment of the present disclosure. Image processing method 200 includes Step 210, Step 220, Step 230 and Step 240.

In Step 210, an original image is read.

In Step 220, the original image is converted to LAB color space to get an L channel layer, an A channel layer and a B channel layer.

In Step 230, a processing is performed on the L channel layer to get a derived L channel layer.

In Step 240, the derived L channel layer, the A channel layer and the B channel layer are combined to form a new image.

In the embodiment, the original image is read by the electronic device, and the original image is converted to LAB color space via the electronic device. The LAB color space describes mathematically all perceivable colors in the three dimensions, L is lightness, and A and B are the color opponents green-red and blue-yellow, respectively. The process done for the L channel layer in Step 230 is similar to the process done for the red channel layer, the green channel layer and the blur channel layer in Step 120, and the detail will not be described again. Only the L channel layer is executed the process in Step 230, and A channel layer and B channel layer remain the original condition. Therefore, in Step 240, the derived L channel layer and the original A channel layer and the original B channel layer are combined to form a new image.

In order to execute the image processing method 100, 200 in the electronic device, the present disclosure provides a non-transitory computer-readable storage medium which stores a computer program instruction that performs the image processing method 100, 200 after loading in the electronic device. Wherein the non-transitory computer-readable storage medium can be read-only memory, flash memory, or hard disk drive. The non-transitory computer-readable storage medium can store computer program instructions which can be executed by the electronic device.

As described above, the present disclosure has the following advantages.

1. The ground of the diffusion-coefficient equations in the present disclosure are based on marginal probability density equation, and different weight-parameters are given to different directions. Therefore, the quality of image processing is improved.

2. Choosing smoothing diffusion equation or sharping diffusion equation as the diffusion-coefficient equation base on the values of the gradient-variations is to facilitate sharping the region with larger gradient. Hence, the image can reduce noise while preserving the detail features.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An image processing method, comprising:
reading an original image which comprises a red channel layer, a green channel layer and a blue channel layer;
performing a processing on the red channel layer, the green channel layer and the blue channel layer, respectively, to get a derived red channel layer, a derived green channel layer and a derived blue channel layer, the processing comprising:
calculating gradient-variations of a plurality of directions of a region;
calculating an average of the gradient-variations;
providing a calculating procedure to decide diffusion-coefficient equations of the directions, each of the diffusion-coefficient equations being substituted into an anisotropic diffusion equation, wherein the anisotropic diffusion equation is expressed as shown below:

$$I = I_0 + \lambda \times \Sigma_{i=1}^{n}[c(|\nabla I_i|)\nabla I_i];$$

if one of the gradient-variations being smaller than or equal to the average, the diffusion-coefficient equation of the corresponding direction being a smoothening equation expressed as shown below:

$$c(|\nabla I_i|) = \sin^2\left(\frac{\pi}{2} \times e^{-(|\nabla I_i|/k^2)}\right) \times \alpha;$$

and
if one of the gradient-variations being larger than the average, the diffusion-coefficient equation of the corresponding direction being a sharpening equation expressed as shown below:

$$c(|\nabla I_i|) = \cos^2\left(\frac{\pi}{2} \times e^{-(|\nabla I_i|/k^2)}\right) \times \beta;$$

where $I_0$ is an original data of the region, I is a derived data of the region, $\lambda$ is a constant for controlling the diffusion-speed, $\nabla I_i$ is each gradient-variation, k is a constant for controlling each gradient-variation $\nabla I_i$, and $\alpha$ and $\beta$ are predetermined weight-parameters; and
combining the derived red channel layer, the derived green channel layer and the derived blue channel layer to form a new image.

2. The image processing method of claim 1, wherein a number of the directions is eight, and two horizontal directions, two longitudinal directions and two diagonal directions are included.

3. The image processing method of claim 2, wherein $\alpha$ of each of the horizontal directions and each of the longitudinal directions is $\sqrt{2}$, and $\alpha$ of each of the diagonal directions is 1.

4. The image processing method of claim 2, wherein $\beta$ of each of the horizontal directions and each of the longitudinal directions is $1\sqrt{2}$, and $\beta$ of each of the diagonal directions is ½.

5. The image processing method of claim 1, wherein the process is performed five times.

6. An image processing method, comprising:
reading an original image;
converting the original image to LAB color space to get an L channel layer, an A channel layer and a B channel layer;
performing a processing on the L channel layer to get a derived L channel layer, the processing comprising:
calculating gradient-variations of a plurality of directions of a region;
calculating an average of the gradient-variations;
providing a calculating procedure to decide diffusion-coefficient equations of the directions, each of the diffusion-coefficient equations being substituted into an anisotropic diffusion equation, wherein the anisotropic diffusion equation is expressed as shown below:

$$I = I_0 + \lambda \times \Sigma_{i=1}^{n}[c(|\nabla I_i|)\nabla I_i];$$

if one of the gradient-variations being smaller than or equal to the average, the diffusion-coefficient equation of the corresponding direction being a smoothening equation expressed as shown below:

$$c(|\nabla I_i|) = \sin^2\left(\frac{\pi}{2} \times e^{-(|\nabla I_i|/k^2)}\right) \times \alpha;$$

and
if one of the gradient-variations being larger than the average, the diffusion-coefficient equation of the corresponding direction being a sharpening equation expressed as shown below:

$$c(|\nabla I_i|) = \cos^2\left(\frac{\pi}{2} \times e^{-(|\nabla I_i|/k^2)}\right) \times \beta;$$

where $I_0$ is an original data of the region, I is a derived data of the region, $\lambda$ is a constant for controlling the diffusion-speed, $\nabla I_i$ is each gradient-variation, k is a constant for controlling each gradient-variation $\nabla I_i$, and $\alpha$ and $\beta$ are predetermined weight-parameters; and
combining the derived L channel layer, the A channel layer and the B channel layer to form a new image.

7. The image processing method of claim 6, wherein a number of the directions is eight, and two horizontal directions, two longitudinal directions and two diagonal directions are included.

8. The image processing method of claim 7, wherein $\alpha$ of each of the horizontal directions and each of the longitudinal directions is $\sqrt{2}$, and $\alpha$ of each of the diagonal directions is 1.

9. The image processing method of claim 7, wherein $\beta$ of each of the horizontal directions and each of the longitudinal directions is $1\sqrt{2}$, and $\beta$ of each of the diagonal directions is ½.

10. The image processing method of claim 6, wherein the process is performed five times.

11. A non-transitory computer-readable storage medium, which stores a computer program instruction that performs an image processing method after loading in an electronic device, wherein the image processing method comprises:
reading an original image which comprises a red channel layer, a green channel layer and a blue channel layer;
performing a processing on the red channel layer, the green channel layer and the blue channel layer, respectively, to get a derived red channel layer, a derived green channel layer and a derived blue channel layer, the processing comprising:
calculating gradient-variations of a plurality of directions of a region;
calculating an average of the gradient-variations;
providing a calculating procedure to decide diffusion-coefficient equations of the directions, each of the diffusion-coefficient equations being substituted into an anisotropic diffusion equation, wherein the anisotropic diffusion equation is expressed as shown below:

$$I = I_0 + \lambda \times \Sigma_{i=1}^{n}[c(|\nabla I_i|)\nabla I_i];$$

if one of the gradient-variations being smaller than or equal to the average, the diffusion-coefficient equation of the corresponding direction being a smoothening equation expressed as shown below:

$$c(|\nabla I_i|) = \sin^2\left(\frac{\pi}{2} \times e^{-(|\nabla I_i|/k^2)}\right) \times \alpha;$$

and
if one of the gradient-variations is larger than the average, the diffusion-coefficient equation of the corresponding direction is a sharpening equation expressed as shown below:

$$c(|\nabla I_i|) = \cos^2\left(\frac{\pi}{2} \times e^{-(|\nabla I_i|/k^2)}\right) \times \beta;$$

where $I_0$ is an original data of the region, I is a derived data of the region, $\lambda$ is a constant for controlling the diffusion-speed, $\nabla I_i$ is each gradient-variation, k is a constant for controlling each gradient-variation $\nabla I_i$, and $\alpha$ and $\beta$ are predetermined weight-parameters; and
combining the derived red channel layer, the derived green, channel layer and the derived blue channel layer to form a new image.

12. The non-transitory computer-readable storage medium of claim 11, wherein a number of the directions is eight, and two horizontal directions, two longitudinal directions and two diagonal directions are included.

13. The non-transitory computer-readable storage medium of claim 12, wherein $\alpha$ of each of the horizontal directions and each of the longitudinal directions is $\sqrt{2}$, and $\alpha$ of each of the diagonal directions is 1.

14. The non-transitory computer-readable storage medium of claim 12, wherein $\beta$ of each of the horizontal directions and each of the longitudinal directions is $1/\sqrt{2}$, and $\beta$ of each of the diagonal directions is ½.

15. The non-transitory computer-readable storage medium of claim 11, wherein the process is performed five times.

\* \* \* \* \*